(12) United States Patent
Huang (10) Patent No.: US 11,008,110 B2
(45) Date of Patent: May 18, 2021

(54) HYBRID POWER SYSTEM FOR AN AIRCRAFT

(71) Applicant: GE Aviation Systems LLC, Grand Rapids, MI (US)

(72) Inventor: Hao Huang, Troy, OH (US)

(73) Assignee: GE Aviation Systems LLC

(*) Notice: Subject to any disclaimer, the term of this patent is extended or adjusted under 35 U.S.C. 154(b) by 0 days.

(21) Appl. No.: 16/590,939

(22) Filed: Oct. 2, 2019

(65) Prior Publication Data

US 2020/0148375 A1 May 14, 2020

Related U.S. Application Data

(63) Continuation of application No. 15/999,220, filed on Aug. 17, 2018, now Pat. No. 10,472,078, which is a continuation of application No. 15/077,178, filed on Mar. 22, 2016, now Pat. No. 10,227,137.

(51) Int. Cl.
*B64D 27/24* (2006.01)
*B64D 27/10* (2006.01)
*B64D 27/02* (2006.01)

(52) U.S. Cl.
CPC ............ *B64D 27/24* (2013.01); *B64D 27/10* (2013.01); *B64D 2027/026* (2013.01); *B64D 2221/00* (2013.01); *Y02T 50/40* (2013.01); *Y02T 50/60* (2013.01)

(58) Field of Classification Search
CPC combination set(s) only.
See application file for complete search history.

(56) References Cited

U.S. PATENT DOCUMENTS

| | | | |
|---|---|---|---|
| 5,977,645 A * | 11/1999 | Glennon | H02J 4/00 290/40 F |
| 8,393,565 B2 | 3/2013 | Frank et al. | |
| 8,757,542 B2 | 6/2014 | Hopdjianian et al. | |
| 9,162,771 B2 | 10/2015 | Roggemans et al. | |
| 9,169,027 B2 | 10/2015 | Strauss et al. | |
| 10,689,082 B2 * | 6/2020 | Armstrong | B63H 21/21 |

(Continued)

FOREIGN PATENT DOCUMENTS

| | | |
|---|---|---|
| EP | 2581308 A2 | 4/2013 |
| EP | 2985901 A1 | 2/2016 |
| WO | WO2014158240 A2 | 10/2014 |

OTHER PUBLICATIONS

PCT International Search Report Corresponding to PCT/US2017/021237 dated May 9, 2017.

*Primary Examiner* — Adam D Houston
(74) *Attorney, Agent, or Firm* — Dority & Manning, P.A.

(57) ABSTRACT

Systems and methods for distributing in an aircraft are provided. More particularly, in one embodiment, a system can include one or more gas turbine engines configured to provide propulsion and electrical power to an aircraft. The system can further include one or more electrical engines configured to provide propulsion for the aircraft. The system can include one or more first electrical power systems configured to provide power to the one or more electrical engines for one or more electrical power propulsion loads for the aircraft. The system can further include one or more second electrical power systems configured to provide power for one or more non-propulsion electrical power loads of the aircraft.

20 Claims, 5 Drawing Sheets

(56) References Cited

U.S. PATENT DOCUMENTS

| | | | |
|---|---|---|---|
| 2004/0025490 A1* | 2/2004 | Paul | F02K 3/02 60/39.43 |
| 2005/0006954 A1* | 1/2005 | Bowman | H02J 1/14 307/9.1 |
| 2005/0056021 A1 | 3/2005 | Belokon et al. | |
| 2005/0229838 A1* | 10/2005 | Lyons | F02C 9/28 117/11 |
| 2007/0018035 A1* | 1/2007 | Saiz | B64C 29/0033 244/12.3 |
| 2008/0277944 A1* | 11/2008 | Schwarz | F02C 7/32 290/4 C |
| 2009/0127855 A1* | 5/2009 | Shander | H02J 4/00 290/7 |
| 2009/0293474 A1* | 12/2009 | Lucia | F02B 41/10 60/597 |
| 2010/0044129 A1* | 2/2010 | Kyle | B60L 50/16 180/65.25 |
| 2010/0193629 A1* | 8/2010 | Breit | B64D 11/04 244/58 |
| 2010/0252691 A1* | 10/2010 | Malkin | F16H 25/20 244/76 R |
| 2012/0025032 A1* | 2/2012 | Hopdjanian | B60L 3/0046 244/53 R |
| 2012/0175886 A1* | 7/2012 | Donnelly | F02C 6/18 290/1 C |
| 2013/0094963 A1 | 4/2013 | Rolt | |
| 2013/0111917 A1* | 5/2013 | Ho | F02C 7/36 60/773 |
| 2014/0008971 A1* | 1/2014 | Hoffmann | H02P 25/22 307/9.1 |
| 2014/0306460 A1* | 10/2014 | Donnelly | F02C 7/32 290/1 A |
| 2014/0333127 A1* | 11/2014 | Edwards | H02J 4/00 307/9.1 |
| 2015/0274306 A1* | 10/2015 | Sheridan | B64D 35/02 60/772 |
| 2015/0367950 A1 | 12/2015 | Rajashekara et al. | |
| 2016/0016670 A1 | 1/2016 | Sautreuil et al. | |
| 2016/0023773 A1 | 1/2016 | Himmelmann et al. | |
| 2016/0031567 A1* | 2/2016 | Roques | B60K 16/00 244/54 |
| 2016/0047303 A1* | 2/2016 | Davidson | F02C 7/06 60/791 |
| 2016/0047307 A1* | 2/2016 | Williamson | F01K 23/18 290/52 |
| 2016/0047309 A1* | 2/2016 | Davidson | F02C 7/06 290/52 |
| 2016/0047319 A1* | 2/2016 | Gieras | F01D 15/10 60/788 |
| 2016/0111885 A1* | 4/2016 | Roques | H01H 1/64 307/9.1 |
| 2016/0185462 A1* | 6/2016 | Edwards | H02P 29/0243 701/34.4 |
| 2016/0186570 A1* | 6/2016 | Lugg | F01D 5/34 416/3 |
| 2016/0236767 A1* | 8/2016 | Mores | B64C 1/40 |
| 2016/0236790 A1* | 8/2016 | Knapp | G08G 5/0021 |
| 2016/0355272 A1* | 12/2016 | Moxon | B64D 27/02 |
| 2016/0355275 A1* | 12/2016 | Seger | B64D 41/00 |
| 2017/0190434 A1* | 7/2017 | Dong | H02M 5/458 |
| 2017/0275009 A1* | 9/2017 | Huang | B64D 27/10 |
| 2018/0079515 A1* | 3/2018 | Harwood | B63H 21/17 |
| 2018/0087656 A1* | 3/2018 | Poster | F16H 57/02 |
| 2018/0291807 A1* | 10/2018 | Dalal | B60L 50/61 |
| 2019/0016470 A1* | 1/2019 | Huang | B64D 27/10 |
| 2019/0161209 A1* | 5/2019 | Casado-Montero | B64F 1/10 |
| 2019/0181786 A1* | 6/2019 | Singh | B64D 35/00 |
| 2019/0186360 A1* | 6/2019 | Sellers | F02C 7/32 |
| 2019/0344898 A1* | 11/2019 | Scothern | B64D 27/12 |
| 2019/0382121 A1* | 12/2019 | Schwarz | B64D 47/00 |
| 2019/0382123 A1* | 12/2019 | Schwarz | B64D 27/02 |
| 2020/0055610 A1* | 2/2020 | Terwilliger | H02J 7/007 |
| 2020/0063599 A1* | 2/2020 | Waun | B60L 50/10 |
| 2020/0070679 A1* | 3/2020 | Wang | B60L 58/21 |
| 2020/0083823 A1* | 3/2020 | Latulipe | B64D 35/02 |
| 2020/0180771 A1* | 6/2020 | Moore | B64D 29/00 |
| 2020/0256243 A1* | 8/2020 | Blythe | F02B 37/14 |
| 2020/0259557 A1* | 8/2020 | Fortin | B64F 5/60 |
| 2020/0271061 A1* | 8/2020 | Kopeschka | F02C 9/48 |
| 2020/0271075 A1* | 8/2020 | Duge | F02C 7/125 |

* cited by examiner

HYBRID POWER SYSTEM FOR AN AIRCRAFT

CROSS-REFERENCE TO RELATED APPLICATION

This application is a continuation of U.S. application Ser. No. 15/999,220, filed on Aug. 17, 2018, which is a continuation of U.S. application Ser. No. 15/077,178, filed on Mar. 22, 2016, each of which is hereby expressly incorporated herein by reference in their entireties.

FIELD OF THE INVENTION

The present subject matter relates generally to distributing electrical power associated with a hybrid electrical power system in an aircraft.

BACKGROUND OF THE INVENTION

A new generation of aircraft can include hybrid electrical systems. These systems can allow for aircraft propulsion to be generated by summation of both turbo-engine propulsion and electrical propulsion. The components of the electrical system that generates the electrical propulsion can have power ratings (e.g., megawatts, multi-megawatts) that are much greater than the power ratings of the components of a conventional aircraft electrical system.

Implementing components with high power ratings using conventional aircraft electrical system components can be difficult. For instance, given the low voltage ratings associated with conventional aircraft electrical system, the currents in the power transmission cables would become very high. Additionally, megawatt power loads can cause volubility risks due to increased electromagnetic interference. While replacing conventional transmission cables with ones of larger size would allow for higher current, this approach would require adding up to several thousand pounds of transmission cables to the aircraft.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a system for distributing electrical power in an aircraft. The system can include one or more gas turbine engines configured to provide propulsion and electrical power to an aircraft. The system can further include one or more electrical engines configured to provide propulsion for the aircraft. The system can include one or more first electrical power systems configured to provide power to the one or more electrical engines for one or more electrical power propulsion loads on the aircraft. The system can further include one or more second electrical power systems configured to provide power for one or more non-propulsion electrical power loads of the aircraft.

Another example aspect of the present disclosure is directed to a method for distributing electrical power in an aircraft. The method can include monitoring, by one or more control devices, an operational status of a lower voltage electrical power system included on an aircraft. The lower voltage electrical power system can be configured to provide power to one or more onboard systems of the aircraft for one or more non-propulsion electrical power loads. The method can further include detecting, by the one or more control devices, a failure associated with the lower voltage electrical power system based at least in part on the operational status. The method can include coupling, by the one or more control devices, a high voltage electrical power system to the lower voltage electrical power system based at least in part on the detected failure such that the high voltage electrical power system can provide power to the lower voltage electrical power system for the one or more non-propulsion electrical power loads of the aircraft.

Yet another example aspect of the present disclosure is directed to an aircraft. The aircraft can include one or more gas turbine engines configured to provide propulsion and electric power to the aircraft. The aircraft can further include one or more electrical engines. The aircraft can further include one or more onboard systems configured to receive power for one or more non-propulsion electrical power loads. The aircraft can include one or more high voltage electrical power systems configured to receive a first power generated by one or more of the gas turbine engines and to provide a second power to the one or more electrical engines. The aircraft can further include one or more lower voltage electrical power systems configured to receive a third power generated by one or more of the gas turbine engines and to provide a fourth power to the one or more onboard systems.

Other example aspects of the present disclosure are directed to systems, methods, aircraft, avionics systems, devices, non-transitory computer-readable media for distributing electrical power in an aircraft.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for distributing electrical power from various power systems in an aircraft. For instance, an aircraft can include one or more gas turbine engine(s), one or more electrical engine(s), a high voltage electrical power system, and a lower voltage electrical power system. The high voltage and lower voltage electrical power systems can receive power generated by the gas turbine engine(s). The lower voltage electrical power system can then provide power to the onboard systems of the aircraft (e.g., navigational systems, lighting systems) for non-propulsion electrical power loads (e.g., to perform navigational functions, illuminate cabin lights) in a way that has been robusted, bug-freed, and extra-safety proven. The high voltage electrical power system can provide high voltage power to the electrical engine(s) for additional propulsion of the aircraft. By providing high voltage to the electrical engine(s), the power ratings of the hybrid electrical system can be met without increasing the current. Accordingly, the systems of the present disclosure can, among other things, accomplish significant weight savings by avoiding the addition of heavier transmission cables.

More particularly, an aircraft can include one or more gas turbine engine(s) and one or more electrical engine(s). The gas turbine engine(s) can provide propulsion and electrical power for the aircraft. For instance, one or more generator(s) can be associated with the gas turbine engine(s). The generator(s) can be coupled to one or more spool shaft(s) of the gas turbine engine(s) to generate power for the aircraft power system. The power system can then provide power to the electrical engine(s), which can also provide propulsion for the aircraft. The electrical propulsion along with its electrical system can provide boundary layer ingestion around the aircraft fuselage to improve the aerodynamic properties of the aircraft as part of electrical propulsion.

The power system can include one or more first electrical power system(s), one or more second electrical power system(s), and a control system. The first electrical power system(s) can have a higher voltage rating than the second electrical power system(s). In some implementations, the first electrical power system(s) can be configured to operate at a voltage that is at least 1000 Volts DC or 1000 Volts ACRMS, while the second electrical power system(s) can be configured to operate at a lower voltage (e.g., 115 Volts AC, 230 Volts AC, 270 Volts DC, +/−270 Volts DC, or 28 Volts DC).

The first and second electrical power system(s) can receive power from the gas turbine engines. For example, the one or more generator(s) can be coupled to a low spool shaft of the gas turbine engine(s) to generate power for the first electrical power system(s). The first electrical power system(s) can receive such power and, if needed, adjust the voltage (e.g., via transformer, power converter) to the higher voltage at which the first electrical power system(s) operate. Additionally, and/or alternatively, the generator(s) can be coupled to a high spool shaft of the gas turbine engine(s) to generate power for the second electrical power system(s). The second electrical power system(s) can receive the power and, if needed, adjust the voltage (e.g., via a transformer, power converter) to the voltage at which the second electrical power system(s) operate.

The first electrical power system(s) can provide power to the one or more electrical engine(s) for one or more electrical power propulsion load(s). For instance, the first electrical power system(s) can be connected to the electrical engine(s) via a high voltage electrical bus. The first electrical power system(s) can provide power, associated with a high voltage, to the one or more electrical engine(s). The electrical engine(s) can receive the power and use the power to rotate its fan blades providing a thrust force to the aircraft.

The second electrical power system(s) can provide power, to the onboard system(s) of the aircraft, for one or more non-propulsion electrical power load(s). For instance, the second electrical power system(s) can be connected to one or more onboard system(s) (e.g., navigation system, lighting system) via an electrical bus. The voltage rating of the electrical bus can be lower than the voltage rating of the high voltage electrical bus. The second electrical power system(s) can provide power, which can be associated with the lower voltage, to the one or more onboard system(s). The onboard system(s) can receive the power and can use the power for one or more non-propulsion electrical power load(s) such as, for example, to operate a navigation system, to illuminate cabin lights, etc.

The power system can also include a control system that can transfer power between the first electrical power system(s) and the second electrical power system(s). For example, the control system can monitor an operational status of the second electrical power system(s). The operational status can be indicative of one or more electrical characteristics (e.g., amount of power received, amount of power provided, voltage, frequency, current, etc.), health and maintenance data associated with the electrical power system, etc. By way of example, the control device(s) can monitor the amount of power the second electrical power system(s) are receiving from the gas turbine engine(s) and/or providing to the onboard system(s).

The control system can detect a failure associated with the second electrical power system(s) based, at least in part, on the operational status. For example, the control system can detect a failure associated with the second electrical power system(s) when the amount of power received and/or provided by the second electrical power system(s) decreases below a threshold. The threshold can be indicative of an amount of power associated with normal operation of the aircraft, the requirements of the onboard system(s), the power necessary for the non-propulsion electrical power loads of the aircraft, etc.

The control system can transfer power from the first electrical power system(s) to the second electrical power system(s) when a failure is detected. For example, the power system can include one or more contactor(s) configured to couple one or more of the first electrical power system(s) to one or more of the second electrical power system(s). When the control system detects a failure associated with the second electrical power system(s) (e.g., indicating an inability to provide power for the non-propulsion electrical power loads), the control system can send one or more command signal(s) to the contactor(s) to couple one or more of the first electrical power system(s) to one or more of the second electrical power system(s). In this way, the first electrical power system(s) can provide power to the second electrical power system(s) for the non-propulsion electrical power loads (e.g., operating the onboard system(s)) of the aircraft.

The systems and methods according to example aspects of the present disclosure can provide power to an aircraft in a more efficient manner. More particularly, the systems and methods can meet the high voltage ratings of a hybrid system without the need for heavier transmission cables. This can help avoid increases in fuel usage as well as the increased power transfer loss of larger cables. Furthermore, the systems and methods can provide internal back-up power availability. As a result, the systems and methods can effectively distribute power to an aircraft while also increasing redundancy. In this way, the systems and methods according to example aspects of the present disclosure have a technical effect of providing power to an aircraft in a more efficient manner by decreasing aircraft weight, fuel usage, and power transfer loss, while meeting the voltage requirements of hybrid aircraft systems.

Figure 1:
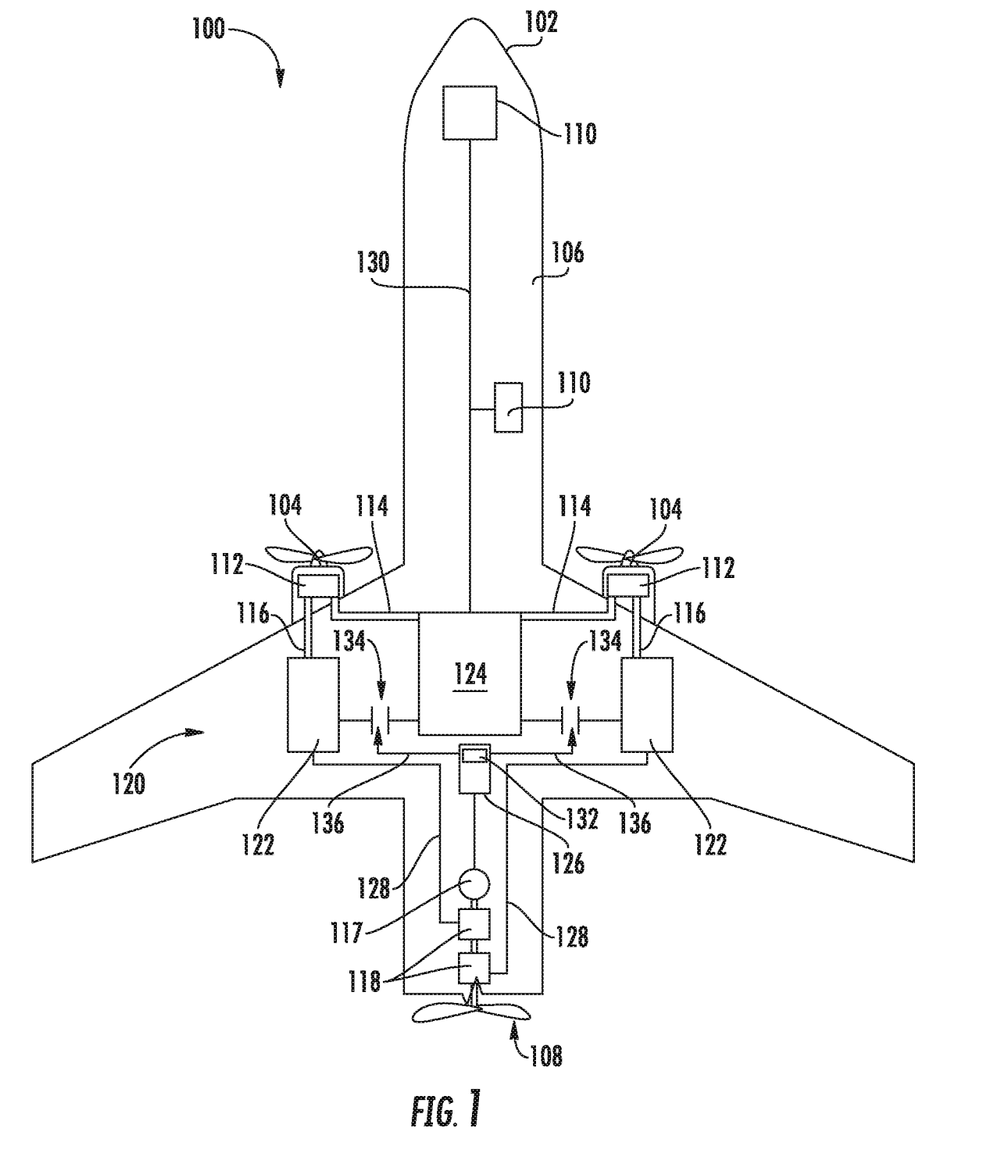
FIG. 1 depicts aspects of an example system for distributing electrical power in an aircraft according to example embodiments of the present disclosure.

FIG. 1 depicts aspects of an example system 100 for distributing electrical power in an aircraft according to example embodiments of the present disclosure. As shown, the system 100 can include an aircraft 102. The aircraft 102 can include one or more engine(s) 104, a fuselage 106, one or more electrical engine(s) 108, one or more onboard system(s) 110, and/or a power system 120.

The engine(s) 104 can be configured to provide propulsion for the aircraft 102. For example, the engine(s) 104 can be configured as gas turbine engines. For example, the engine(s) 104 can include a compressor section, a combustion section, and a turbine section in serial flow order. The engine(s) 104 can be configured as turbofan engines, turbojet engines, turboprop engines, turboshaft engines, etc. In other implementations, the engine(s) 104 can be internal combustion engines, or any other suitable engine for use in an aircraft.

The engine(s) 104 can be configured to provide electrical power for the aircraft 102. For instance, one or more generator(s) 112 can be associated with the one or more engine(s) 104. The generator(s) 112 can be coupled to a high spool shaft 114 of the engine(s) 104 to generate power for the power system 120. For example, the generator(s) 112 can be configured to convert the mechanical power associated with the high spool shaft 114 to electrical power and provide such electrical power to the power system 120. Additionally, and/or alternatively, in a similar manner, the generator(s) 112 can be coupled to a low spool shaft 116 of the engine(s) 104 to generate power for the power system 120.

The electrical engine(s) 108 can include a gearbox 117, one or more motor(s), a fan shaft, and/or a plurality of fan blades. The one or more motor(s) 118 can be configured to receive power from the power system 120, as further described below. The fan shaft can be mechanically coupled to the motor(s) 118 through the gearbox 117. The gearbox 117 can be configured to modify a rotational speed of the motor(s) 118, or rather of a shaft of the motor(s) 118, such that the fan blades of the electrical engine(s) 108 rotate at a desired rotational speed. The gearbox 117 can be a fixed ratio gearbox, or alternatively, the gearbox 117 can define a variable gear ratio. With such an implementation, the gearbox 117 can be operably connected to, for example, a control system of the aircraft 102 for changing its ratio in response to one or more flight conditions.

The electrical engine(s) 108 can be configured to provide propulsion for the aircraft 102. For instance, the motor(s) 118 can be configured to receive power from the power system 120. The motor(s) 118 can be configured to use the power to rotate the fan blades, thereby providing thrust for the aircraft 102.

In some implementations, the electrical engine(s) 108 can be configured to provide boundary layer ingestion for the aircraft 102. For instance, the electrical engine(s) 108 can be configured as one or more Boundary Layer Ingestion (BLI) fan(s), which can be configured to ingest and consume air forming a boundary layer over the fuselage 106 of the aircraft 102. As shown in FIG. 1, the electrical engine(s) 108 can be fixedly connected to the fuselage 106 at the aft end, such that the electrical engine(s) 108 are incorporated into and/or blended with a tail section at the aft end. However, it should be appreciated that in various other embodiments, some of which will be discussed below, the electrical engine(s) 108 can also, and/or alternatively, be positioned at any suitable location of the aircraft 102.

In some implementations, at least one of the engine(s) 104 or the electrical engine(s) 108 can be configured to operate as one or more ram air turbine(s) to generate electrical power for the aircraft 102. For instance, at least one of the engine(s) 104 or the electrical engine(s) 108 can be configured to allow the airstream surrounding the fuselage 106 to drive its associated blades (e.g., to rotate an associated generator) to extract energy from the airstream. This can be useful, for example, when a source of emergency and/or supplemental power is needed, as further described herein.

The one or more onboard system(s) 110 can be configured to receive power for one or more non-propulsion electrical power load(s). For instance, the onboard system(s) 110 can be configured to perform various aircraft operations and control and/or monitor various settings and parameters associated with the aircraft 102. For instance, the onboard system(s) 110 can be associated with lighting systems, navigation systems (e.g., global positioning systems), aircraft control systems, flight management systems, aircraft maintenance systems, data acquisition systems, a flight recorder, monitoring systems, and/or other systems of the aircraft 102. The onboard system(s) 110 can be configured to receive power for non-propulsion electrical power load(s), for example, to perform one or more function(s) of these systems.

The power system 120 can include one or more first electrical power system(s) 122, one or more second electric power system(s) 124, and a control system 126. The first electrical power system(s) 122, the second electrical power system(s) 124, and/or the control system 126 can be configured to communicate over one or more network(s). The network(s) can include one or more data bus(es) or combination of wired and/or wireless communication links. In some implementations, the system can include any combination of direct current (DC) and/or alternative current (AC), while associated electrical buses can be DC electrical buses and/or AC electrical buses.

The first electrical power system(s) 122 can have a different voltage rating than the second electrical power system(s) 124. The first electrical power system(s) 122 can be a high voltage electrical power system. The first electrical power system(s) 122 can be configured to operate at a first voltage that is at least 1000 Volts DC or 1000 Volts ACRMS. The second electrical power system(s) 124 can be lower voltage electrical power system configured to operate at a second voltage that is lower than the first voltage. For instance, the second electrical power system(s) 124 can be configured to operate at least one of 115 Volts AC, 230 Volts AC, 270 Volts DC, +/−270 Volts DC, or 28 Volts DC. In some implementations, the first voltage associated with the first electrical power system(s) 122 can be at least two times greater than the second voltage associated with the second electrical power system(s) 124.

The engine(s) 104 can be configured to generate power for the one or more first electrical power system(s) 122. For example, the one or more generator(s) 112 can be coupled to the low spool shaft 116 of the one or more engine(s) 104 (e.g., gas turbine engines) to generate a first power for the one or more first electrical power system(s) 122. The first electrical power system(s) 122 can be configured to receive the first power generated by one or more of the engine(s) 104 and, if needed, adjust the voltage (e.g., via a transformer, power converter) to the higher voltage at which the first electrical power system(s) 122 operate.

The first electrical power system(s) 122 can be configured to provide power to the one or more electrical engine(s) 108 for one or more electrical power propulsion load(s). For instance, the first electrical power system(s) 122 can be connected to the electrical engines 108 via a high voltage electrical bus 128. The first electrical power system(s) 122 can be configured to provide a second power, which can be associated with a high voltage, to the one or more electrical engine(s) 108. As shown in FIG. 1, in some implementations, the second power can be provided to one of the motor(s) 118. The electrical engine(s) 108 can be configured to receive the second power to rotate its fan blades providing a thrust force to the aircraft 102.

The engine(s) 104 can also, and/or alternatively, be configured to generate power for the one or more second electrical power system(s) 124. For example, the one or more generator(s) 112 can be coupled to the high spool shaft 114 of the one or more engine(s) 104 (e.g., gas turbine engines) to generate a third power for the one or more second electrical power system(s) 124. The second electrical power system(s) 124 can be configured to receive the third power generated by one or more of the engine(s) 104 and, if needed, adjust the voltage (e.g., via a transformer, power converter) to the voltage at which the second electrical power system(s) 124 operate.

The second electrical power system(s) 124 can be configured to provide power, to the one or more onboard system(s) 110, for one or more non-propulsion electrical power load(s) of the aircraft 102. For instance, the second electrical power system(s) 124 can be connected to the onboard system(s) 110 via an electrical bus 130. The voltage rating of the electrical bus 130 can be lower than the voltage rating of the high voltage electrical bus 128. The second electrical power system(s) 124 can be configured to provide a fourth power, which can be associated with the lower voltage, to the one or more onboard system(s) 110. The onboard system(s) 110 can be configured to receive the fourth power for one or more non-propulsion electrical power load(s). This can include, for example, performing the non-propulsion functions of the onboard system(s) 110 (e.g., illuminating cabin lights).

As shown in FIG. 1, in some implementations, the system 100 can include a plurality of first electrical power system(s) 122 that provide power to a single electrical engine 108. More specifically, the one or more engine(s) 104 can include a plurality of gas turbine engines. The one or more first electrical power system(s) 122 can include a plurality of high voltage electrical power systems. The one or more electrical engine(s) 108 can include a single electrical engine. Each gas turbine engine can be configured to generate power for at least one high voltage electrical power system and the plurality of high voltage electrical power systems can be configured to provide power to the single electrical engine. For example, each high voltage electrical power system can be configured to provide power to a different motor 118 of the single electrical engine. In some implementations, the single electrical engine can be configured to provide boundary layer ingestion for the aircraft 102.

The power system 120 can include a control system 126 that can be configured to control various components of the power system 120. The control system 126 can include one or more control device(s) 132 that can be associated with, for instance, an avionics system. The control device(s) 132 can include one or more controllers, sensors and/or other control devices configured to perform various measurements and to control various aspects of the aircraft 102.

For instance, the control device(s) 132 can be configured to monitor one or more operational status(es) of the power system 120. The control device(s) 132 can be configured to monitor an operational status of the one or more first electrical power system(s) 122 (e.g., high voltage electrical power system(s)) and/or the one or more second electrical power system(s) 124 (e.g., lower voltage electrical power system(s)). The control device(s) 132 can be configured to monitor the operational status via one or more sensor(s) and/or one or more feedback signal(s) that include data associated with the operational status of a component of the power system 120. The operational status can be indicative of one or more electrical characteristics (e.g., power received, power provided, voltage, frequency, current), health and maintenance data associated with the first and/or second electrical power system(s) 122 and 124, and/or other data associated with a component of the aircraft 102. By way of example, the control device(s) 132 can be configured to monitor the amount of power the second electrical power system(s) 124 received from the generator(s) 112 and/or provided to the onboard system(s) 110.

The control device(s) 132 can be configured to detect a failure associated with the power system 120. The control device(s) 132 can be configured to detect a failure associated with the first electrical power system(s) 122 and/or the second electrical power system(s) 124 based, at least in part, on the operational status. For example, the control device(s) 132 can be configured to detect a failure associated with the second electrical power system(s) 124 (e.g., lower voltage power system(s)) when the amount of power received and/or provided by the second electrical power system(s) 124 decreases below a threshold. The threshold can be indicative of an amount of power associated with normal operation of the aircraft 102, the requirements of the onboard system(s) 110, the power necessary for the non-propulsion electrical power loads of the aircraft 102, etc. Such a decrease in power can indicate a hindrance in the ability of the second electrical power system(s) 124 to receive power and/or provide for one or more of the non-propulsion electrical power load(s) of the aircraft 102.

The control device(s) 132 can be configured to transfer power from the first electrical power system(s) 122 to the second electrical power system(s) 124. For example, the power system 120 can include one or more contactor(s) 134 configured to adjust between an open position and a closed position. The contractor(s) 134 can include tie bus contactors, switches, relays, and/or other suitable switching devices. The one or more contactor(s) 134 can be configured to couple one or more of the first electrical power system(s) 122 to one or more of the second electrical power system(s) 124 when in the closed position. When the control device(s) 132 detect a failure associated with the second electrical power system(s) 124 (e.g., indicating an inability to provide power for the non-propulsion electrical power loads), the control device(s) 132 can be configured to send one or more command signal(s) 136 to the one or more contactor(s) 134 to couple one or more of the first electrical power system(s)

122 to one or more of the second electrical power system(s) 124. In this way, one or more of the first electrical power system(s) 122 can provide power (e.g., a fifth power) to one or more of the second electrical power system(s) 124 for the one or more non-propulsion electrical power loads of the aircraft 102. This transfer of power can allow, for example, the functions of the onboard system(s) 110 to continue with little to no electrical interruption.

The numbers, locations, and/or orientations of the components of example system 100 are for purposes of illustration and discussion and are not intended to be limiting. Those of ordinary skill in the art, using the disclosures provided herein, shall understand that the numbers, locations, and/or orientations of the components of the system 100 can be adjusted without deviating from the scope of the present disclosure.

Figure 2:
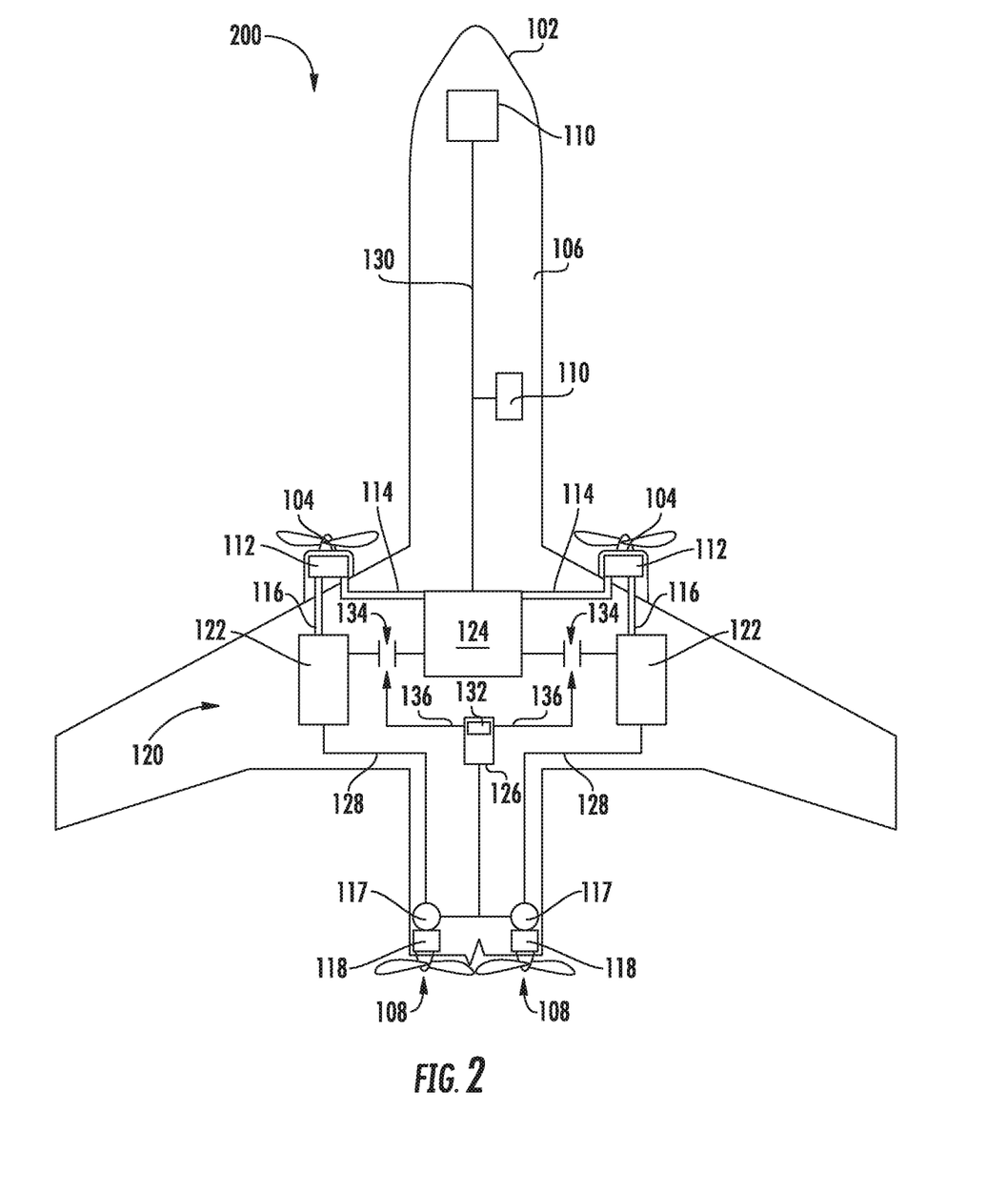
FIG. 2 depicts aspects of an example system for distributing electrical power in an aircraft according to example embodiments of the present disclosure.

For example, FIG. 2 depicts aspects of another example system 200 for distributing electrical power in an aircraft according to example embodiments of the present disclosure. The system 200 can include similar components as those described with reference to FIG. 2.

In some implementations, the one or more engine(s) 104 of system 200 can include a plurality of gas turbine engines. The one or more first electrical power system(s) 122 can include a plurality of high voltage electrical power systems and the one or more electrical engine(s) 108 can include a plurality of electrical engines. Each gas turbine engine can be configured to generate power for at least one high voltage electrical power system, and each of the high voltage electrical power systems can be configured to provide power to at least one of the electrical engines.

For instance, as shown in FIG. 2, the system 200 includes left and right-oriented engine(s) 104, left and right-oriented first electrical power system(s) 122, and left and right-oriented electrical engine(s) 108. The left-oriented engine 104 can be configured to provide power to the left oriented first electrical power system 122, which can be configured to provide power to the left-oriented electrical engine 108. The right-oriented engine 104 can be configured to provide power to the right-oriented first electrical power system 122, which can be configured to provide power to the right-oriented electrical engine 108. The electrical engine(s) 108 can be located near the tail section of the aircraft 102 and can be configured to provide boundary layer ingestion and/or propulsion for the aircraft 102.

Figure 3:
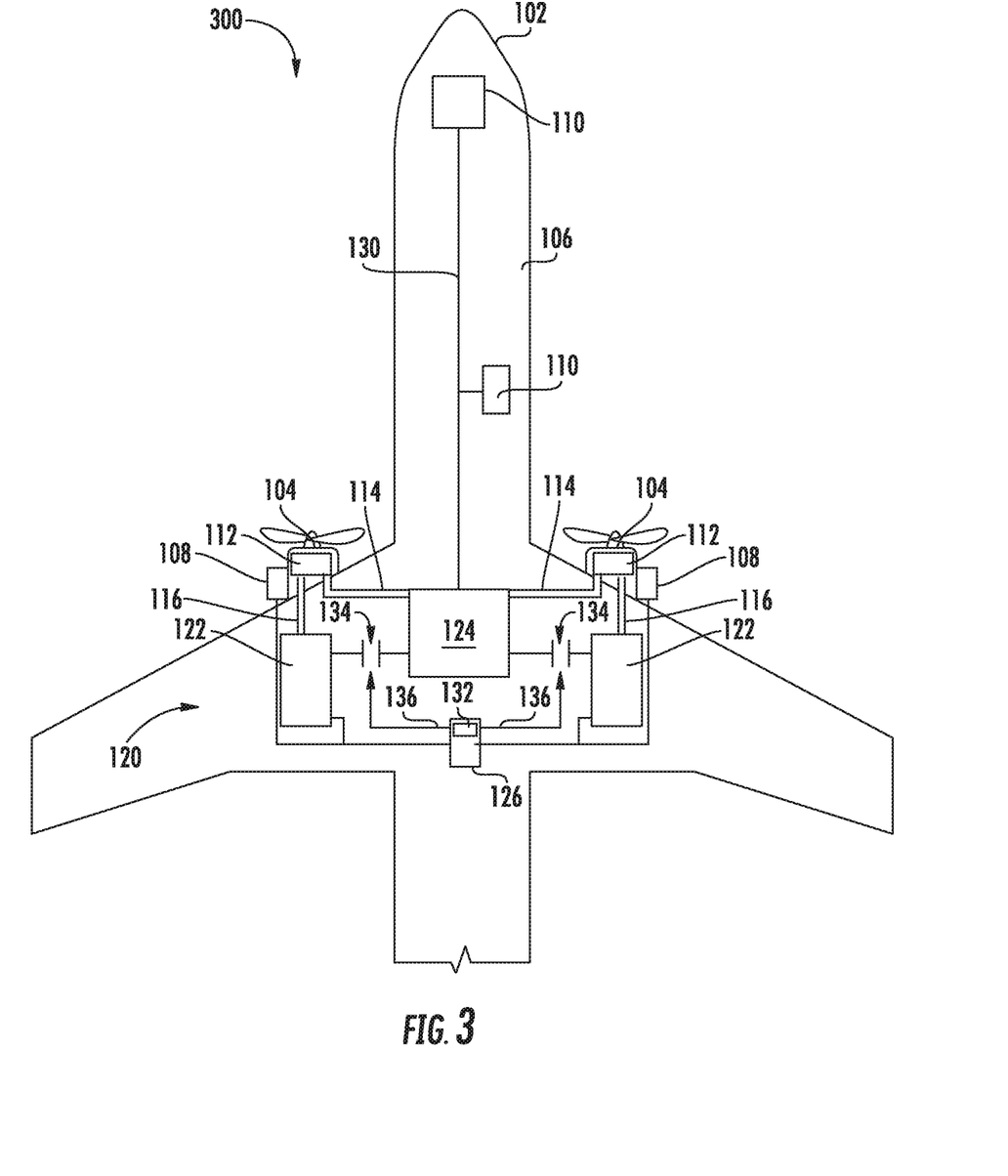
FIG. 3 depicts aspects of an example system for distributing electrical power in an aircraft according to example embodiments of the present disclosure.

FIG. 3 depicts aspects of another example system 300 for distributing electrical power in an aircraft according to example embodiments of the present disclosure. The system 300 can include similar components as those described with reference to FIG. 1.

In the system 300, the one or more engine(s) 104 can include a plurality of gas turbine engines, while the one or more first electrical power system(s) 122 can include a plurality of high voltage electrical power system(s). The one or more electrical engine(s) 108 can include a plurality of electrical engine(s) that can be included with the one or more engine(s) 104. At least one electrical engine 108 can be configured to provide rotational power to at least one engine 104 to provide propulsion for the aircraft 102.

For example, one or more electrical engine(s) 108 can be included with an engine 104 (e.g., the left-oriented engine) and one or more electrical engine(s) 108 can be included with another engine 104 (e.g., the right-oriented engine). At least one of the electrical engine(s) 108 included with the left-oriented engine 104 can be configured to provide rotational power to the left-oriented engine 104. At least one of the electrical engine(s) 108 included with the right-oriented engine 104 can be configured to provide rotational power to the right-oriented engine 104. In this way, the electrical engine(s) 108 can be configured to provide rotational power, to at least one engine 104, to provide propulsion for the aircraft 102.

Figure 4:
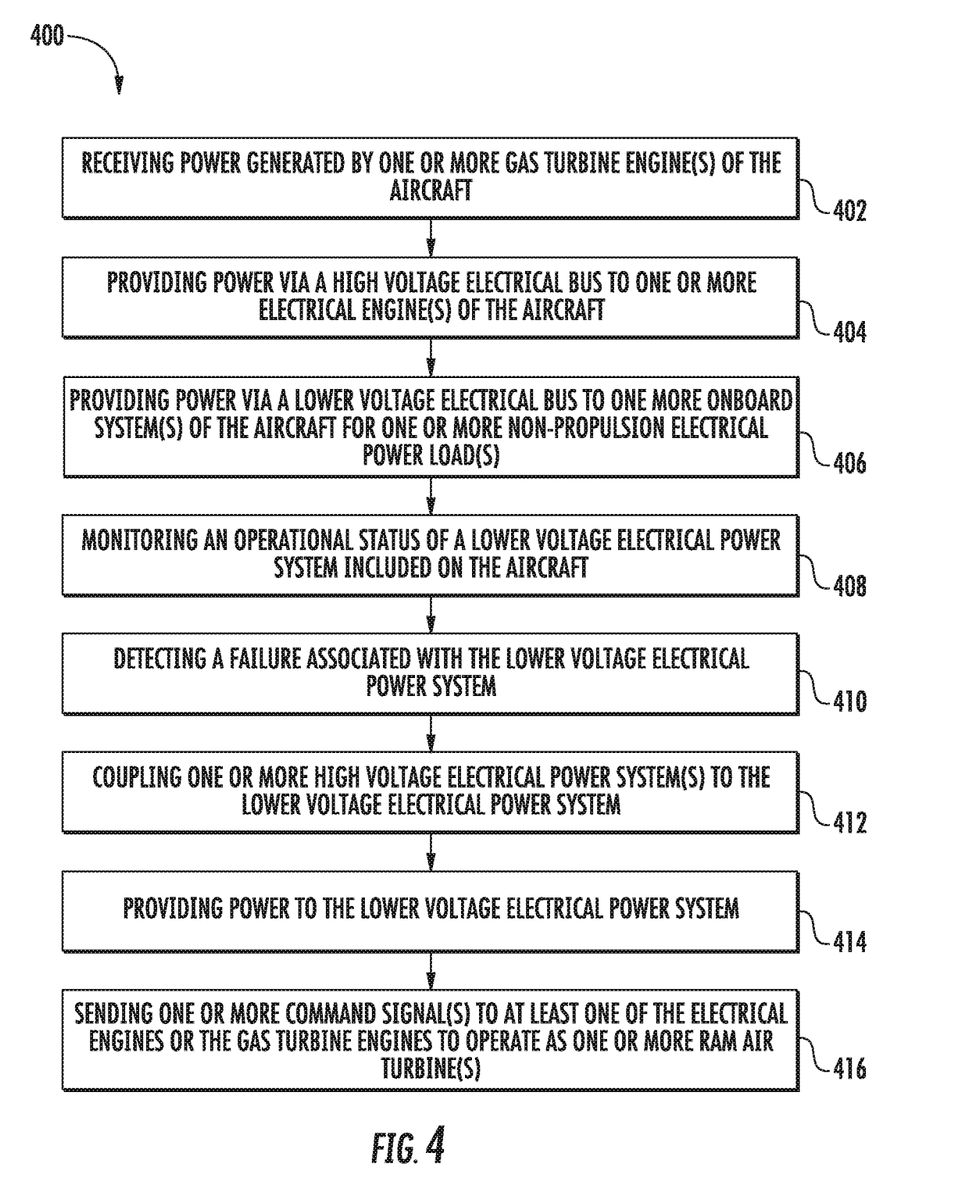
FIG. 4 depicts a flow diagram of an example method for distributing electrical power in an aircraft according to example embodiments of the present disclosure.

FIG. 4 depicts a flow diagram of an example method 400 for distributing electrical power in an aircraft according to example embodiments of the present disclosure. FIG. 4 can be implemented by a power system, such as the power system 120 described herein. One or more step(s) of the method 400 can be performed while the aircraft 102 is in-flight. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method 400 can include receiving power generated by one or more gas turbine engines of the aircraft. For example, the power system 120 can receive power from the engine(s) 104 (e.g., gas turbine engines). As described above, the first electrical power system(s) 122 can receive power from the generator(s) 112 coupled to the low spool shaft 116 of the engine(s) 104. The second electrical power system(s) 124 can receive power from the generator(s) 112 coupled to the high spool shaft 114 of the engine(s) 104. The first electrical power system(s) 122 (e.g., high voltage electrical power system(s)) can be configured to operate at a first voltage of at least 1000 Volts DC or 1000 Volts ACRMS, and the second electrical power system(s) 124 (e.g., lower voltage electrical power system(s)) can be configured to operate at a second voltage that is lower than the first voltage.

At (404), the method 400 can include providing power via a high voltage electrical bus to one or more electrical engines of the aircraft for one or more propulsion electrical power loads. For instance, the power system 120 can provide power to the electrical engine(s) 104. More particularly, the first electrical power system(s) 122 (e.g., high voltage electrical power system(s)) can provide power to the electrical engine(s) 108 via the high voltage electrical bus 128. The electrical engine(s) 108 can receive the power and use it for propulsion electrical power loads (e.g., to provide a thrust force to the aircraft 102).

At (406), the method 400 can include providing power via a lower voltage electrical bus to one or more onboard system(s) of the aircraft for one or more non-propulsion electrical power load(s). For instance, the power system 120 can provide power to the onboard system(s) 110 for one or more non-propulsion electrical power load(s). More particularly, the second electrical power system(s) 124 can provide power to one or more onboard system(s) 110 of the aircraft 102 for one or more non-propulsion electrical power load(s) via the lower voltage bus 130. A first voltage rating associated with the high voltage electrical bus 128 can be higher than a second voltage rating associated with the lower voltage electrical bus 130. The onboard system(s) 110 can be configured to receive the power and consume it for one or more non-propulsion electrical power load(s) (e.g., to perform the non-propulsion functions of the onboard system(s) 110).

At (408), the method 400 can include monitoring an operational status of a lower voltage electrical power system included on the aircraft. The power system 120 can monitor the operational status of a lower voltage electrical power system. For instance, the control device(s) 132 of the power system 120 can monitor the operational status of one or more second electrical power system(s) 124 (e.g., lower voltage electrical power system(s)) included on the aircraft 102. For example, the control device(s) 132 can monitor the amount of power being received and/or provided by one or more of the second electrical power system(s) 124.

At (410), the method 400 can include detecting a failure associated with the lower voltage electrical power system. The power system 120 can detect a failure associated with the lower voltage electrical power system. For instance, the control device(s) 132 can detect a failure associated with one or more of the second electrical power system(s) 124 (e.g., lower voltage electrical power system(s)) based, at least in part, on the operational status. In some implementations, the failure of the second electrical power system(s) 124 can, at least partially, inhibit at least one of an ability of the second electrical power system(s) 124 to receive power from one or more engine(s) 104 of the aircraft 102 or an ability of the second electrical power system(s) 124 to provide power for the one or more non-propulsion electrical power load(s) of the aircraft 102.

For example, as indicated above, the control device(s) 132 can be configured to detect a failure associated with one or more of the second electrical power system(s) 124 when the amount of power received and/or provided by the second electrical power system(s) 124 decreases below a threshold (e.g., associated with a normal operational amount of power). The failure can inhibit the ability of the second electrical power system(s) 124 to receive power from the engine(s) 104 and/or provide power to the onboard system(s) 110.

At (412), the method 400 can include coupling one or more high voltage electrical power systems to the lower voltage electrical power system. The power system 120 can couple one or more high voltage power system(s) to one or more lower voltage electrical power system(s). For instance, the control device(s) 132 can couple one or more of the first electrical power system(s) 122 (e.g., high voltage electrical power system(s)) to one or more of the second electrical power system(s) 124 (e.g., lower voltage electrical power system(s)) based, at least in part, on the detected failure associated with one or more of the second electrical power system(s) 124.

For example, to couple the first and second electrical power system(s) 122 and 124, the control device(s) 132, of the power system 120, can send one or more command signal(s) 136 to the one or more contactor(s) 134 (e.g., tie bus contractors) to couple one or more of the second electrical power system(s) 124 to one or more of the first electrical power system(s) 122. The contactor(s) 134 can adjust from an open position to a closed position in which the contactor(s) 134 can couple the first and second electrical power system(s) 122 and 124. In this way, one or more of the first electrical power system(s) 122 can provide power to the second electrical power system(s) 124 for the one or more non-propulsion electrical power load(s) of the aircraft 102.

At (414), the method 400 can include providing power to the lower voltage electrical power system. For instance, the power system 120 can provide power to the lower voltage electrical power system. More particularly, one or more of the first electrical power system(s) 122 of the power system 120 can provide power to one or more of the second electrical power system(s) 124 (e.g., lower voltage electrical power system(s)) such that power can be provided for non-propulsion electrical power load(s) of the aircraft 102. In some implementations, the first electrical power system(s) 122, the second electrical power system(s) 124, and/or the contactor(s) 134 can be associated with a transformer and/or a power converter. The transformer and/or the power converter can adjust the first voltage (e.g., high voltage) and/or first power of the first electrical power system(s) 122 to a second voltage (e.g., lower voltage) and/or second power of the second electrical power system(s) 124.

At (416), the method 400 can include sending one or more command signal(s) to at least one of the electrical engines or the gas turbine engines to operate as one or more ram air turbine(s). The power system 120 can send such command signals. For instance, the control device(s) 132 of the power system 120 can send one or more command signal(s) to at least one of the electrical engine(s) 108 or the engine(s) 104 (e.g., gas turbine engine(s)) to operate as one or more ram air turbine(s). The electrical power generated by the ram air turbine(s) can be provided to the first and/or the second electrical power system(s) 122 and 124. For example, electrical power generated by the ram air turbine(s) can be provided to the second electrical power system(s) 124 when the second electrical power system(s) 124 experience a failure. In this way, the electrical power generated by the ram air turbine(s) can be provided for the non-propulsion electrical power load(s) of the aircraft 102.

Figure 5:
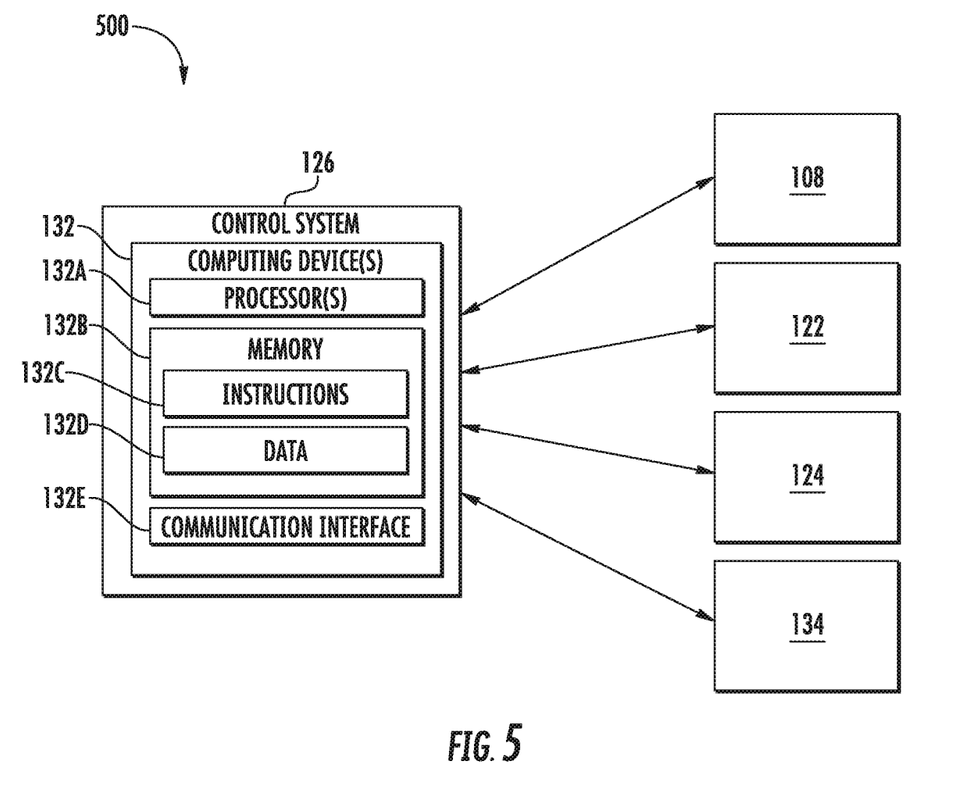
FIG. 5 depicts aspects of an example system according to example embodiments of the present disclosure.

FIG. 5 depicts an example system 500 according to example embodiments of the present disclosure. The system 500 can include the electrical engine(s) 108, the first electrical power system(s) 122, the second electrical power system(s) 124, the control system 126, and the contactor(s) 134. The components of the system 500 can be configured to communicate via wired and/or wireless communication links.

As shown, the control system 126 can include one or more control device(s) 132. The control device(s) 132 can include one or more processor(s) 132A and one or more memory device(s) 132B. The one or more processor(s) 132A can include any suitable processing device, such as a microprocessor, microcontroller, integrated circuit, logic device, or other suitable processing device. The one or more memory device(s) 132B can include one or more computer-readable media, including, but not limited to, non-transitory computer-readable media, RAM, ROM, hard drives, flash drives, or other memory devices.

The one or more memory device(s) 132B can store information accessible by the one or more processor(s) 132A, including computer-readable instructions 132C that can be executed by the one or more processor(s) 132A. The instructions 132C can be any set of instructions that when executed by the one or more processor(s) 132A, cause the one or more processor(s) 132A to perform operations. The instructions 132C can be software written in any suitable programming language or can be implemented in hardware. In some embodiments, the instructions 132C can be executed by the one or more processor(s) 132A to cause the one or more processor(s) 132A to perform operations, such as the operations and functions for which the control device(s) 132 are configured, as described herein, and/or any other operations or functions of the one or more control device(s) 132. The memory device(s) 132B can further store data 132D that can be accessed by the processors 132A. For example, the data 132D can include the data associated with the operational status of the first and/or second electrical power system(s) 122 and 124, data indicative of one or more threshold(s), etc.

The control device(s) 132 can also include a network interface 132E used to communicate, for example, with the other components of system 500. The network interface 132E can include any suitable components for interfacing with one more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for distributing electrical power in an aircraft, the system comprising:
   one or more gas turbine engines configured to provide propulsion and electrical power to an aircraft;
   one or more electrical engines configured to provide propulsion for the aircraft;
   one or more first electrical power systems configured to provide power to the one or more electrical engines for one or more electrical power propulsion loads on the aircraft; and
   one or more second electrical power systems;
   wherein the one or more first electrical power systems are configured to operate at a first voltage and the one or more second electrical power system(s) are configured to operate at a second voltage, and wherein the first voltage is higher than the second voltage.

2. The system of claim 1, wherein the first voltage is at least two times greater than the second voltage.

3. The system of claim 1, wherein the first voltage is at least 1000 Volts DC or 1000 Volts ACRMS.

4. The system of claim 1, wherein the one or more gas turbine engines are configured to generate power for the one or more first electrical power systems.

5. The system of claim 4, wherein one or more generators are coupled to a low spool shaft of the one or more gas turbine engines to generate power for the one or more first electrical power systems.

6. The system of claim 1, wherein the one or more gas turbine engines are configured to generate power for the one or more second electrical power systems.

7. The system of claim 6, wherein one or more generators are coupled to a high spool shaft of the one or more gas turbine engines to generate power for the one or more second electrical power systems.

8. The system of claim 1, further comprising:
   one or more contactors configured to adjust between an open position and a closed position, wherein the one or more contactors are configured to couple one or more of the first electrical power systems to one or more of the second electrical power systems when in the closed position.

9. The system of claim 8, further comprising:
   one or more control devices configured to
      monitor an operational status of the one or more second electrical power systems,
      detect a failure associated with the one or more second electrical power systems based at least in part on the operational status, and
      send one or more command signals to the one or more contactors to couple one or more of the first electrical power systems to one or more of the second electrical power systems based at least in part on the detected failure such that one or more of the first electrical power systems can provide power to one or more of the second electrical power systems for the one or more non-propulsion loads of the aircraft.

10. The system of claim 9, further comprising:
    one or more power converters configured to convert a first power associated with the first electrical power systems to a second power associated with the second electrical power systems.

11. The system of claim 1, wherein the one or more gas turbine engines comprise a plurality of gas turbine engines, wherein the one or more first electrical power systems comprise a plurality of high voltage electrical power systems, wherein the one or more electrical engines comprise a single electrical engine, wherein each gas turbine engine is configured to generate power for at least one high voltage electrical power system, and wherein the plurality of high voltage electrical power systems is configured to provide power to the single electrical engine.

12. The system of claim 11, wherein the single electrical engine is configured to provide boundary layer ingestion for the aircraft.

13. The system of claim 1, wherein the one or more gas turbine engines comprise a plurality of gas turbine engines, wherein the one or more first electrical power systems comprise a plurality of high voltage electrical power systems, wherein the one or more electrical engines comprise a plurality of electrical engines, wherein each gas turbine engine is configured to generate power for at least one high voltage electrical power system, and wherein each of the high voltage electrical power systems is configured to provide power to at least one of the electrical engines.

14. The system of claim 1, wherein the one or more gas turbine engines comprise a plurality of gas turbine engines, wherein the one or more first electrical power systems comprise a plurality of high voltage electrical power systems, wherein the one or more electrical engines comprise a plurality of electrical engines, and wherein at least one electrical engine is configured to provide rotational power to at least one gas turbine engine to provide propulsion for the aircraft.

15. The system of claim 1, wherein at least one of the electrical engines or the gas turbine engines are configured to operate as one or more ram air turbines to generate electrical power for the aircraft.

16. A method for distributing electrical power in an aircraft, the method comprising:
   monitoring, by one or more control devices, an operational status of a lower voltage electrical power system included on an aircraft,
   detecting, by the one or more control devices, a failure associated with the lower voltage electrical power system based at least in part on the operational status; and
   coupling, by the one or more control devices, a high voltage electrical power system to the lower voltage electrical power system based at least in part on the detected failure.

17. The method of claim 16, wherein the high voltage electrical power system is configured to operate at a first voltage of at least 1000 Volts DC or 1000 Volts ACRMS, and wherein the lower voltage electrical power system is configured to operate at a second voltage that is lower than the first voltage.

18. The method of claim 16, wherein the failure of the lower voltage electrical power system at least partially inhibits at least one of an ability of the lower voltage electrical power system to receive power from one or more gas turbine engines of the aircraft or an ability of the lower voltage electrical power system to provide power for the one or more non- propulsion electrical power loads of the aircraft.

19. The method of claim 16, wherein coupling, by the one or more control devices, the high voltage electrical power system to the lower voltage electrical power system comprises:
   sending, by the one or more control devices, one or more command signals to one or more tie bus contactors to couple the high voltage electrical power system to the lower voltage electrical power system.

20. An aircraft, comprising:
   one or more gas turbine engines configured to provide propulsion and electric power to the aircraft;
   one or more electrical engines;
   one or more onboard systems configured to receive power for one or more non- propulsion electrical power loads;
   one or more high voltage electrical power systems configured to receive a first power generated by one or more of the gas turbine engines and to provide a second power to the one or more electrical engines;
   one or more lower voltage electrical power systems configured to receive a third power generated by one or more of the gas turbine engines and to provide a fourth power to the one or more onboard systems;
   one or more contactors configured to couple one or more of the lower voltage electrical power systems to one or more of the higher voltage electrical power systems; and
   one or more control devices configured to:
      monitor an operational status of the one or more lower voltage electrical power systems,
      detect a failure associated with the one or more lower voltage electrical power systems based at least in part on the operational status, and
      send one or more command signals to the one or more contactors to couple one or more of the high voltage electrical power systems to one or more of the lower voltage electrical power systems based at least in part on the detected failure.

* * * * *